(12) United States Patent
Shintani et al.

(10) Patent No.: US 10,845,954 B2
(45) Date of Patent: Nov. 24, 2020

(54) PRESENTING AUDIO VIDEO DISPLAY OPTIONS AS LIST OR MATRIX

(71) Applicant: Sony Corporation, Tokyo (JP)

(72) Inventors: Peter Shintani, San Diego, CA (US); Brant Candelore, Escondido, CA (US); Mahyar Nejat, San Diego, CA (US)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 15/647,020

(22) Filed: Jul. 11, 2017

(65) Prior Publication Data

US 2019/0018551 A1   Jan. 17, 2019

(51) Int. Cl.
| | | |
|---|---|---|
| G06F 17/00 | (2019.01) | |
| G06F 3/0482 | (2013.01) | |
| H04N 21/262 | (2011.01) | |
| H04L 29/06 | (2006.01) | |
| H04N 21/431 | (2011.01) | |
| H04N 21/422 | (2011.01) | |
| G06F 3/0485 | (2013.01) | |

(52) U.S. Cl.
CPC ............ *G06F 3/0482* (2013.01); *H04L 65/60* (2013.01); *H04N 21/26283* (2013.01); *H04N 21/42204* (2013.01); *H04N 21/4312* (2013.01); *G06F 3/0485* (2013.01)

(58) Field of Classification Search
CPC .. G06F 3/0485; G06F 3/04842; G06F 3/0482; H04N 21/26283; H04N 21/4312; H04N 21/42204
See application file for complete search history.

(56) References Cited

U.S. PATENT DOCUMENTS

| | | |
|---|---|---|
| 6,195,640 B1 | 2/2001 | Mullaly et al. |
| 6,948,136 B2 | 9/2005 | Trewin |
| 7,110,951 B1 | 9/2006 | Pedersen et al. |
| 8,213,916 B1 | 7/2012 | Yankovich et al. |
| 8,494,298 B2 | 7/2013 | Lewis et al. |
| 8,965,216 B2 | 2/2015 | Oshima et al. |
| 8,965,546 B2 | 2/2015 | Visser et al. |
| 9,055,265 B2 | 6/2015 | Shintani et al. |
| 9,124,685 B2 | 9/2015 | Kulas |
| 9,137,484 B2 | 9/2015 | Difrancesco et al. |
| 9,180,053 B2 | 11/2015 | Dalal et al. |
| 9,191,767 B2 | 11/2015 | Hopkins |

(Continued)

FOREIGN PATENT DOCUMENTS

| | | |
|---|---|---|
| EP | 0701366 A2 | 3/1996 |
| JP | 3037041 B2 | 4/2000 |

(Continued)

OTHER PUBLICATIONS

"Flipper Remote", Flipper, 2009, Retrieved from http://cdn.issproducts.com/downloads/221059_Flipper_Remote_Instructions.pdf.

(Continued)

*Primary Examiner* — Andrew T McIntosh
(74) *Attorney, Agent, or Firm* — John L. Rogitz

(57) ABSTRACT

A user such as a vision-impaired person watching an audio video device (AVD) such as a TV may be given the option to define, in his user profile, whether he prefers options (such as channel listings on an electronic program guide (EPG)) to be presented in a two-dimensional matrix format or a one-dimensional list format.

20 Claims, 9 Drawing Sheets

(56) References Cited

U.S. PATENT DOCUMENTS

| | | | |
|---|---|---|---|
| 9,196,239 B1 | 11/2015 | Taylor et al. | |
| 9,197,925 B2 | 11/2015 | Alberth et al. | |
| 9,241,620 B1 | 1/2016 | Kockan | |
| 9,257,114 B2 | 2/2016 | Tanaka | |
| 9,263,027 B2 | 2/2016 | Hopkins et al. | |
| 9,489,928 B2 | 11/2016 | Andrysco et al. | |
| 9,542,027 B2 | 1/2017 | Fan et al. | |
| 9,596,555 B2 | 3/2017 | Kaburlasos et al. | |
| 9,692,776 B2 | 6/2017 | Savant | |
| 10,242,501 B1 | 3/2019 | Pusch et al. | |
| 10,579,732 B2 | 3/2020 | Candelore et al. | |
| 2003/0030752 A1 | 2/2003 | Begeja et al. | |
| 2003/0227406 A1 | 12/2003 | Armstrong | |
| 2004/0051746 A1 | 3/2004 | Litwiller | |
| 2004/0246272 A1 | 12/2004 | Ramian | |
| 2005/0047624 A1 | 3/2005 | Kleen | |
| 2006/0109242 A1 | 5/2006 | Simpkins | |
| 2006/0115799 A1* | 6/2006 | Stephen | G09B 15/06 434/185 |
| 2006/0125796 A1 | 6/2006 | Utz et al. | |
| 2006/0139312 A1* | 6/2006 | Sinclair, II | G06F 3/0481 345/156 |
| 2006/0140420 A1 | 6/2006 | Machida | |
| 2006/0280364 A1 | 12/2006 | Ma et al. | |
| 2007/0109324 A1 | 5/2007 | Lin | |
| 2008/0088471 A1 | 4/2008 | Trappler | |
| 2008/0112614 A1 | 5/2008 | Fluck et al. | |
| 2008/0159406 A1 | 7/2008 | Chujoh et al. | |
| 2008/0291265 A1 | 11/2008 | Wagner et al. | |
| 2009/0260034 A1* | 10/2009 | Friedlander | H04N 5/44582 725/44 |
| 2009/0313582 A1 | 12/2009 | Rupsingh et al. | |
| 2010/0131983 A1 | 5/2010 | Shannon et al. | |
| 2010/0235745 A1 | 9/2010 | Shintani | |
| 2010/0309147 A1 | 12/2010 | Fleizach et al. | |
| 2011/0035031 A1 | 2/2011 | Faenger et al. | |
| 2011/0043644 A1 | 2/2011 | Munger et al. | |
| 2011/0185313 A1 | 7/2011 | Harpaz et al. | |
| 2011/0301722 A1 | 12/2011 | Sato et al. | |
| 2012/0144299 A1 | 6/2012 | Patel et al. | |
| 2012/0167154 A1 | 6/2012 | Kim et al. | |
| 2012/0176303 A1* | 7/2012 | Miyake | G06F 3/017 345/156 |
| 2012/0275701 A1 | 11/2012 | Park et al. | |
| 2012/0324493 A1 | 12/2012 | Holmdahl et al. | |
| 2013/0121515 A1 | 5/2013 | Hooley et al. | |
| 2013/0133022 A1 | 5/2013 | Bi et al. | |
| 2013/0230099 A1 | 9/2013 | Deforest et al. | |
| 2013/0332827 A1* | 12/2013 | Smith | G06F 3/016 715/702 |
| 2014/0196129 A1 | 7/2014 | Amin | |
| 2014/0254828 A1 | 9/2014 | Ray et al. | |
| 2014/0267284 A1 | 9/2014 | Blanche et al. | |
| 2014/0287779 A1 | 9/2014 | O'Keefe et al. | |
| 2014/0314261 A1 | 10/2014 | Selig et al. | |
| 2014/0356848 A1 | 12/2014 | Peterson | |
| 2015/0026587 A1 | 1/2015 | Ollivierre et al. | |
| 2015/0036999 A1 | 2/2015 | Batur et al. | |
| 2015/0045003 A1 | 2/2015 | Vora et al. | |
| 2015/0103154 A1 | 4/2015 | Candelore | |
| 2015/0130703 A1 | 5/2015 | Ghajar | |
| 2015/0153912 A1 | 6/2015 | Reily et al. | |
| 2015/0289124 A1 | 10/2015 | Palin et al. | |
| 2015/0301338 A1 | 10/2015 | Heugten | |
| 2015/0309709 A1 | 10/2015 | Kulkarni et al. | |
| 2015/0373295 A1 | 12/2015 | Outters | |
| 2016/0014540 A1 | 1/2016 | Kelly et al. | |
| 2016/0021481 A1 | 1/2016 | Johnson et al. | |
| 2016/0063894 A1 | 3/2016 | Lee | |
| 2016/0078594 A1 | 3/2016 | Scherlen | |
| 2016/0127764 A1* | 5/2016 | Jung | H04N 5/50 725/56 |
| 2016/0150950 A1 | 6/2016 | Yu et al. | |
| 2016/0166204 A1 | 6/2016 | Stevens et al. | |
| 2016/0170617 A1 | 6/2016 | Shi et al. | |
| 2016/0179463 A1* | 6/2016 | Higa | G06F 3/167 725/52 |
| 2016/0198941 A1 | 7/2016 | Aguilar et al. | |
| 2016/0239253 A1 | 8/2016 | Staffaroni et al. | |
| 2016/0282624 A1 | 9/2016 | Munger et al. | |
| 2016/0320935 A1 | 11/2016 | Shin et al. | |
| 2016/0334977 A1 | 11/2016 | Zaitsev et al. | |
| 2017/0165573 A1 | 6/2017 | Froy et al. | |
| 2017/0265016 A1 | 9/2017 | Oh et al. | |
| 2017/0360295 A1 | 12/2017 | Oz et al. | |
| 2018/0001198 A1 | 1/2018 | Frappiea | |
| 2018/0064330 A1 | 3/2018 | Markus et al. | |
| 2018/0122254 A1 | 5/2018 | Rangan et al. | |
| 2018/0125716 A1 | 5/2018 | Cho et al. | |
| 2018/0129518 A1 | 5/2018 | Lee | |
| 2018/0158385 A1 | 6/2018 | Reichow et al. | |
| 2018/0173505 A1 | 6/2018 | Yan | |

FOREIGN PATENT DOCUMENTS

| | | |
|---|---|---|
| JP | 2008236299 A | 10/2008 |
| KR | 100260702 B1 | 7/2000 |

OTHER PUBLICATIONS

Anabel Martin Gonzalez, "Advanced Imaging in Head-Mounted Displays for Patients with Age-Related Macular Degeneration", Dissertation, Technical University of Munich, Jun. 29, 2011 (pp. No. 1-149).

Carlos Aguilar, Eric Castet, "Evaluation of a gaze-controlled vision enhancement system for reading in visually impaired people", Nice Sophia Antipolis University, Aix Marseille University, Apr. 5, 2017, Nice, France, Marseille, France.

James Ohene-Djan, Rachel Shipsey, "E-Subtitles: Emotional Subtitles as a Technology to assist the Deaf and Hearing-Impaired when Learning from Television and Film.". Goldsmiths College, University of London, 2006, New Cross, London.

John L. Sibert, Mehmet Gokturk, Robert A. Lavine, "The Reading Assistant: Eye Gaze Triggered Auditory Prompting for Reading Remediation", George Washington University, 2000.

Kickstarter, "Nura: Headphones that learn and adapt to your unique hearing", launch date May 16, 2016, website: https://www.kickstarter.com/projects/nura/nura-headphones-that-learn-and-adapt-to-your-unique-hearing.

Rita Oliveira, Jorge Ferraz De Abreu, Ana Margarida Almeida, "Audio Description in Interactive Television (iTV): proposal of a collaborative and voluntary approach", Department of Communication and Arts, University of Aveiro, Sep. 2016, Aveiro, Portugal.

Robert B. Goldstein, Henry Apfelbaum, Gang Luo and Eli Peli "Dynamic Magnification of Video for People with Visual Impairment", May 2003, The Schepens Eye Research Institute, Harvard Medical School, Boston, MA, USA.

Robert Silva, "The ZVOX AV200 AccuVoice TV Speaker Makes Voices and Dialog Clear", Dec. 20, 2016 https://www.lifewire.com/the-zvox-av200-accuvoice-tv-speaker-makes-voices-and-dialog-clear-4086538?utm_source=emailshare&utm_medium=social&utm_campaign=shareurlbuttons.

Shintani et al., "Sensing Viewer Direction of Viewing to Invoke Accessibility Menu in Audio Video Device", file history of related U.S. Appl. No. 15/646,661, filed Jul. 11, 2017. (201705754.01-1168-899).

\* cited by examiner

PRESENTING AUDIO VIDEO DISPLAY OPTIONS AS LIST OR MATRIX

FIELD

The present application relates to technically inventive, non-routine solutions that are necessarily rooted in computer technology and that produce concrete technical improvements.

BACKGROUND

When users of audio video devices (AVD) such as TVs wish to present options such as a channel listing, a matrix of channels typically is presented, in which navigation is possible across rows and own columns. Thus, using a matrix, a user can move up and down and left to right in the list of choices. A matrix provides a means of quickly getting to an item without needing to sequentially move from one item to the next.

SUMMARY

Present principles recognize that a vision-impaired user cannot see a matrix and might be confused or disoriented by the two dimensional navigation in a matrix. As also understood herein, vision-impaired users may find it less confusing to navigate in one dimension, through a list of choices. In a list, every item must be navigated to—one at a time— for example, using the right or left arrow on the remote control, in which case the up and down arrows do not do anything when manipulated. Accordingly, present principles provide such a list and moreover an opportunity to select either a matrix format or a list format.

In an aspect, an article of manufacture includes a computer storage that is not a transitory signal and that in turn includes instructions executable by a processor to receive a command to present on an audio video device (AVD) plural options. The instructions are executable to, responsive to the command, access a data structure indicating how options are to be presented, and responsive to the data structure indicating that that options are to be presented as a list, present on the AVD at least some of the options in a single row or column and present none of the options outside the single row or column. The instructions are further executable to, responsive to the data structure indicating that that options are to be presented as a matrix, present on the AVD at least some of the options in a matrix comprising plural rows and plural columns of the options.

In example embodiments, the command may be a "guide" command, and the plural options may include television channels and/or video programs or movies. The options in the list or matrix can include one or more of broadcast and/or streaming video channels such as TV channels, settings for the AVD and/or a remote controller, invocable software applications, pictures and/or music and/or video.

In non-limiting implementations, the instructions may be executable to present the list in a column on the AVD. The instructions may be executable to, responsive to receiving an up or down command, scroll the column up or down, respectively, but responsive to receiving a left or right command, rearrange the list to be presented in a row on the AVD. Then, the instructions are executable to, responsive to receiving a left or right command, scroll the row left or right, respectively.

Similarly, in non-limiting implementations, the instructions may be executable to present the list in a row on the AVD. The instructions may be executable to, responsive to receiving a left or right command, scroll the column left or right, respectively, but responsive to receiving an up or down command, rearrange the list to be presented in a column on the AVD. Then, the instructions are executable to, responsive to receiving an up or down command, scroll the row up or down, respectively.

In another aspect, an audio video device (AVD) includes a processor and a video display for presenting demanded images under control of the processor. Storage includes instructions executable by the processor to receive indication that a viewer prefers options presented in a list navigable only in one dimension, and responsive to the indication and to a command to present options, present on the display the options in a list.

In another aspect, a method includes presenting on an audio video device (AVD) a first elector selectable to present options in a list. The method also includes presenting on the AVD a second selector selectable to present options in a matrix, and then receiving a command to present options. The method contemplates presenting the options according to whether the first selector or second selector was selected.

The details of the present disclosure, both as to its structure and operation, can be best understood in reference to the accompanying drawings, in which like reference numerals refer to like parts, and in which:

DETAILED DESCRIPTION

Figure 1:
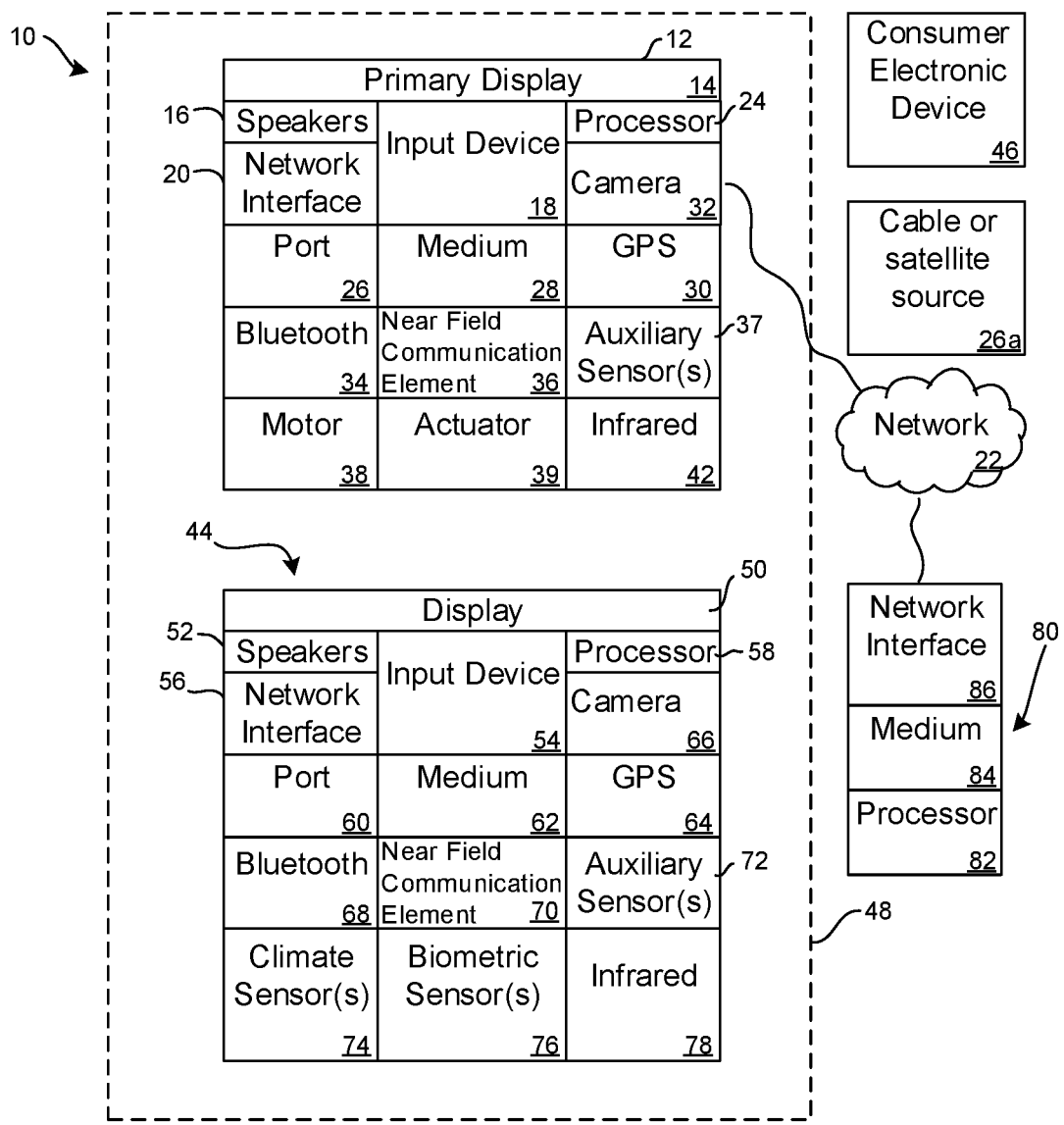
FIG. 1 is a block diagram of an example system including an example in consistent with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figures 2, 2A, 2B:
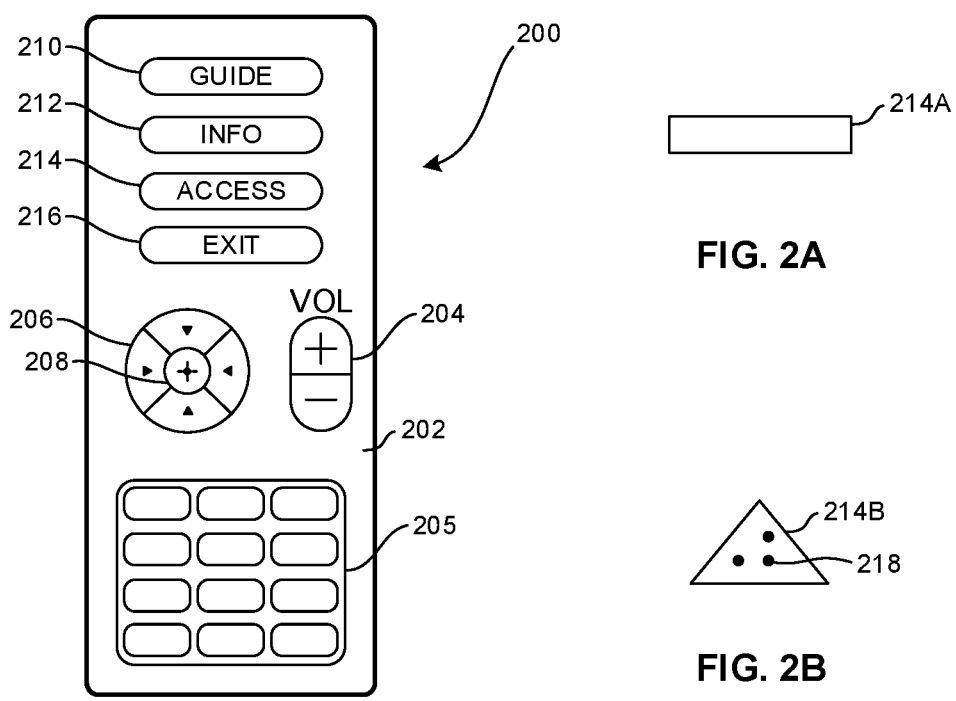
FIG. 2 is a plan view of an example remote control (RC) consistent with present principles.
FIGS. 2A and 2B are plan views of alternate accessibility keys.

FIG. 2 shows a remote control (RC) 200 that may include appropriate components of the above-described CE device 44. Thus, the RC 200 may include one or more internal processors, computer memories, and wireless transmitters such as IR command transmitters to control a device such as the AVDD 12.

As shown, the RC 200 includes a typically plastic, hand-holdable housing 202 with multiple input keys that can be manipulated by a person to cause wireless commands to be sent from the RC 200 to, e.g., the AVDD 12. For example, volume up and down keys 204 may be manipulated to respectively turn the volume of the speakers of the AVDD 12 up and down. An alpha-numeric keypad 205 may be provided on the RC 200 for inputting letters and/or numbers to the AVDD 12. Also, a directional rocker 206 may be provided with each arm of the rocker being manipulable to move a screen cursor up and down and left and right. If desired, a select key 208 may be located in the center of the rocker 206 for input of a "select" command.

Further, in the example shown the RC 200 may include a guide key 210 manipulable to send a command to present an electronic program guide (EPG) on the AVDD 12. Also, an info key 212 may be provided and can be manipulated to send a command to present information related to a selected program on the AVDD 12. An exit key 216 also may be provided to command the AVDD to exit, e.g., the EPG or info page.

According to present principles, an accessibility key (AK) 214 is included on the RC 200. In the example shown, the AK 214 is larger than the other keys on the RC, and has the same shape (oval) as the other keys. In other embodiments, the AK may have a different shape than the other keys on the RC 200. For example, an AK 214A may be rectilinear-shaped as shown in FIG. 2A or triangular-shaped as shown in FIG. 2B or other unique shape such as circular, compared to the other keys on the RC. If desired, a braille code 218 can be provided on the AK for further tactile identification of the AK by a person such as a vision-impaired person.

Circuitry such as one or more of the above-described processors/DSPs etc. may be provided in the RC 200 and may be configured to receive a signal generated from an interaction with the AK, such as a press of the AK, finger hover above the AK, etc. Responsive to the interaction with the AK, the RC 200 may send a command to the AVDD 12 to present a user interface (UI) such as the UI 300 shown in FIG. 3. In addition or alternatively, responsive to the interaction with the AK, the RC 200 may send a command to the AVDD 12 to actuate a talk back function of the AVDD 12. By "talk back" function is meant audible feedback played on one or more speakers of the AVDD 12 in response to user input such as queries or commands, including audio corresponding to visual UI features.

Figure 3:
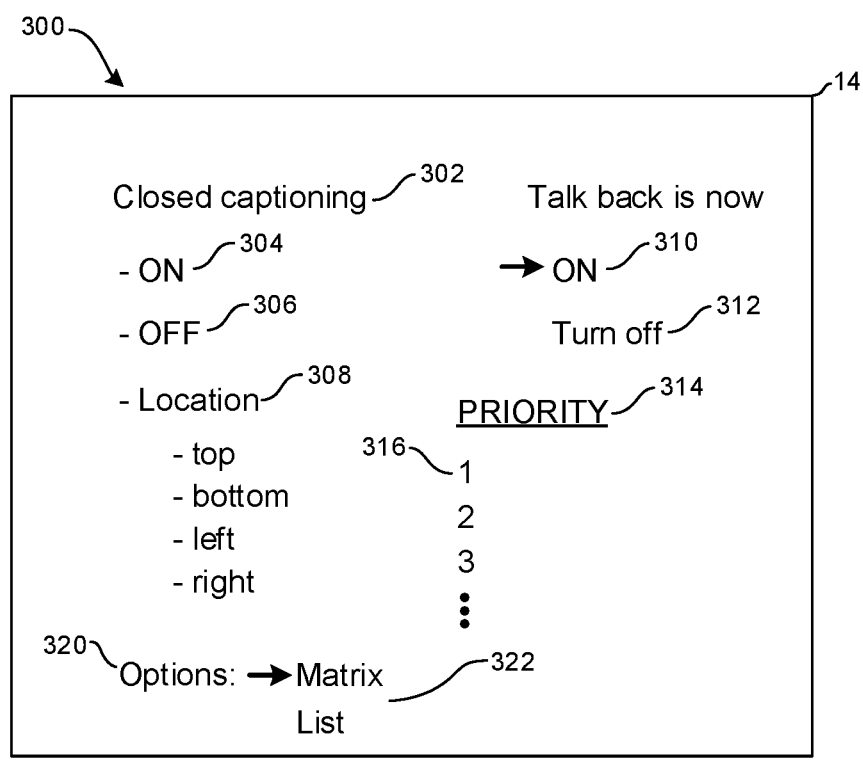
FIG. 3 is a screen shot of an example user interface (UI) consistent with present principles.

As shown in FIG. 3, the UI 300 may include closed captioning options 302 selectable by means of moving a screen cursor using, e.g., the RC 200. An on selector 304 may be selected to turn closed captioning on, meaning closed captioning will be presented on the AVDD 12, while an off selector 306 may be selected to turn off closed captioning.

When closed captioning is selected to be on, a list 308 of locations for the closed captioning may be provided to enable a user to select where the closed captioning will be presented on the display, e.g., at the top, or bottom, or left or right side of the display. The list 308 may be presented on the speakers of the AVDD 12 according to the talk back function.

Returning to the talk back function, as shown by the capitalized "on" message 310 talk back has been automatically enabled responsive to manipulating the AK 214. An off selector 312 may be selected to turn off the talk back function.

In some examples, a priority 314 for the person associated with the profile may be set. One or more priority level selectors 316 may be presented and one of them selected to define the priority of the person, e.g., with "1" indicating highest, "2" indicating next high, and so on.

In some examples, an options presentation prompt 320 may be presented to select a matrix or list selector 322, which subsequently causes multiple available options such as channel or program or video options, etc. to be presented in a matrix or list, respectively, according to description below. Note that the selectors 322 may instead simply be to select whether the user is vision-impaired or not, and for profiles indicating that the user is vision-impaired, options presentation may default to a list.

Figure 4:
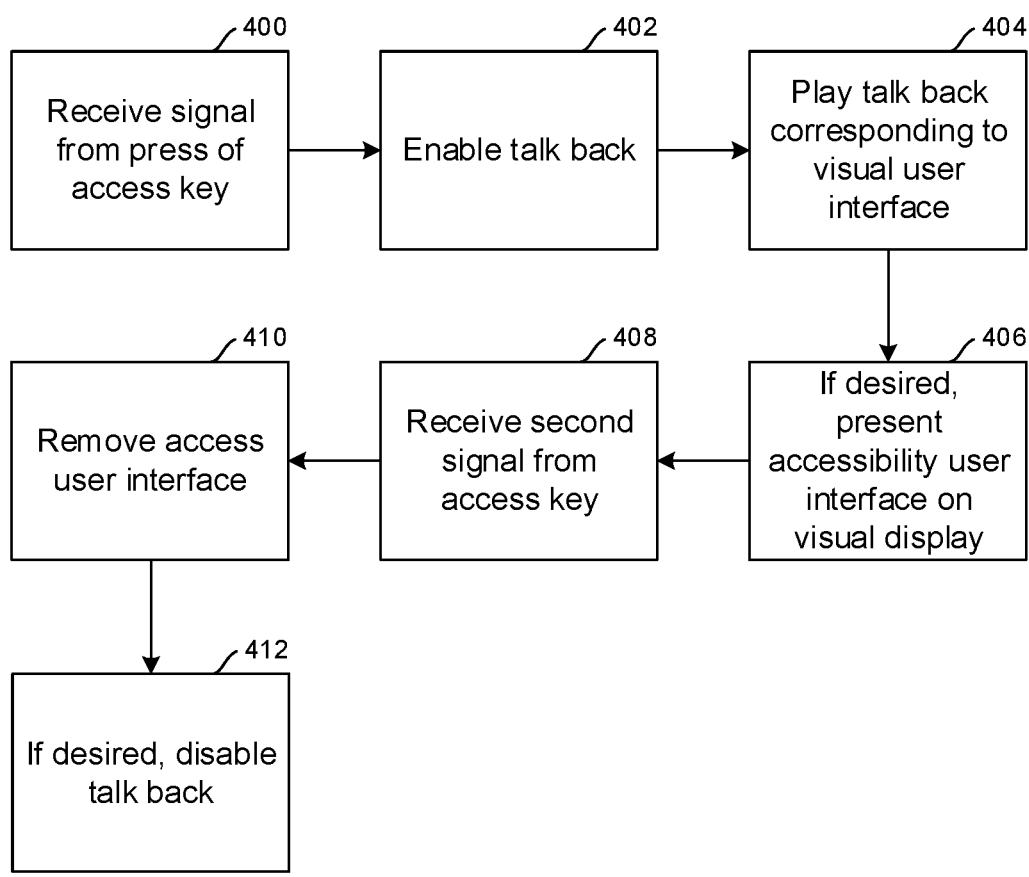
FIG. 4 is a flow chart of example logic consistent with present principles.

FIG. 4 illustrates logic consistent with FIGS. 2 and 3. At block 400 a signal is received by the circuitry in the RC 200 from an interaction with the AK 214. In response, talk back is enabled at block 402, so that audio corresponding, e.g., to the visible UI 300 may be played at block 404.

If desired, at block 406 an accessibility UI such as the example UI 300 may be presented on the AVDD 12 to enable establishing one or more accessibility options, including talk back and closed captioning preferences. When it is desired to remove the UI 300 from view, the user can press the AK 214 a second time, which is received at block 408 to cause the AVDD 12 to remove the accessibility UI at block 410. Talk may also be disabled if desired at block 412 responsive to toggling the AK 214.

Figure 5:
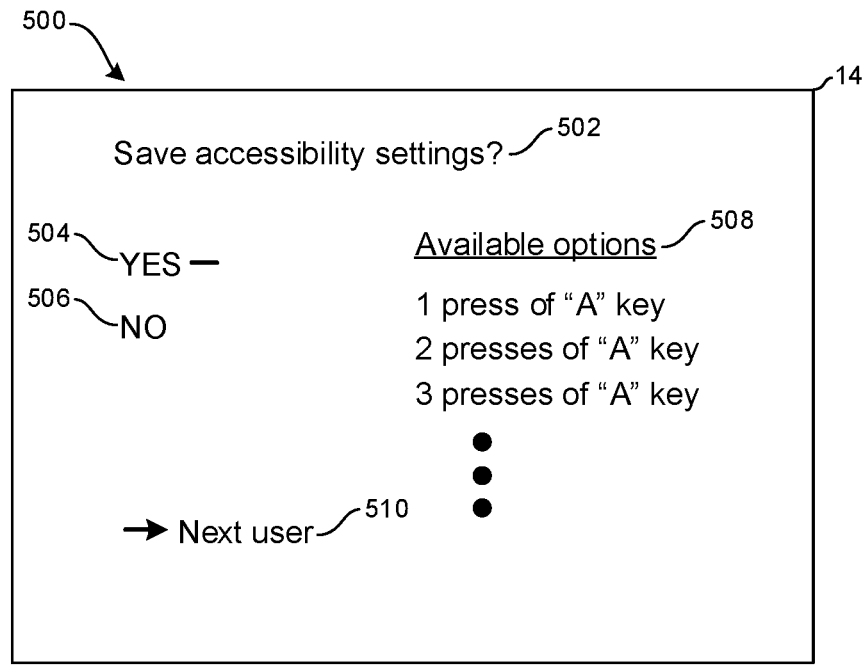
FIG. 5 is a screen shot of an example UI for establishing user access setting profiles.
Figure 6:
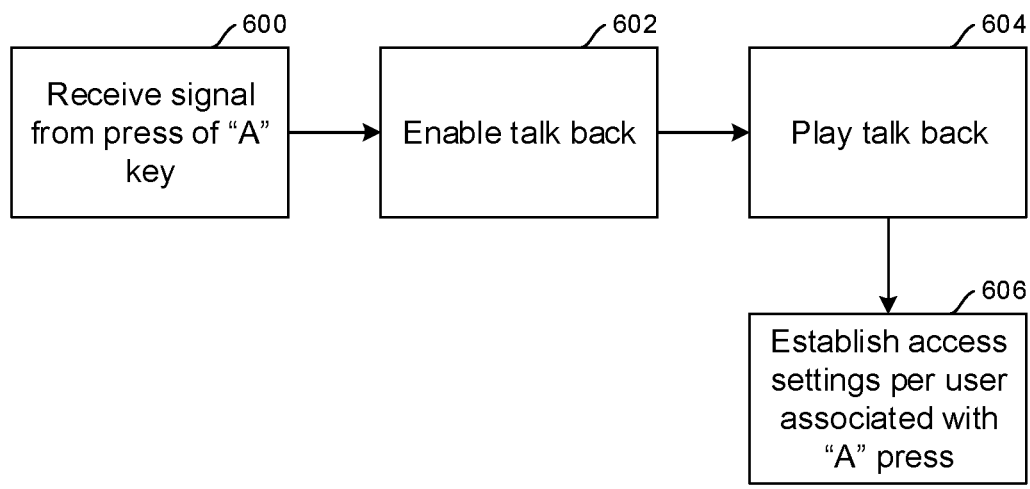
FIG. 6 is a flow chart of example logic consistent with FIG. 5.

In addition to the above-discussed functionality of the AK 214, FIGS. 5 and 6 illustrate alternative or additional functionality that may be provided by the AK. FIG. 5 illustrates a UI 500 that may be invoked on the AVDD 12 by any appropriate means that prompts a user to save accessibility settings as may have been established using the UI 300 of FIG. 3. A user can select a yes selector 504 to save the settings and a no selector 506 to not save the settings.

Additionally, a list 508 may be presented of setting establishment enablement options. More particularly, by selecting a type of press of the AK 214 from the list 508, a user can correlate future presses of the selected type with the saved accessibility settings, which are automatically established in the AVDD 12 when future AK manipulations of the selected type are effected. For example, as shown the user can select to correlate his personal settings with one, two, or three (in quick succession) presses of the AK. Additional press type options may include a press and hold, two presses and holds, etc. A next user selector 510 may then be selected to enable another user to establish a different set of accessibility settings, including no special accessibility settings at all.

FIG. 6 shows that at block 600 a signal from a press of the AK 214 may be received by the AVDD, which in response may automatically enable the above-described talk back function at block 602. Any prompts or other UI features of the AVDD may be presented audibly at block 604 using the talk feature. As described above, the user's accessibility settings are automatically established on the AVDD at block 606 responsive to the press of the AK 214.

Thus, multiple users can correlate respective AK press types with respective accessibility settings. For instance, an impaired user may establish accessibility settings such as presenting closed captioning automatically simply by manipulating the AK according to the type of manipulation associated with the impaired user's settings. When the impaired user is absent, a non-impaired person may then establish his or her accessibility settings, including the removal of all special accessibility options if so set, automatically by manipulating the AK according to the non-impaired user's type of manipulation. In this way, accessibility settings can be easily and automatically changed by users according to their preference simply by manipulating a single top level key (the AK 214) on the RC 200.

Figure 7:
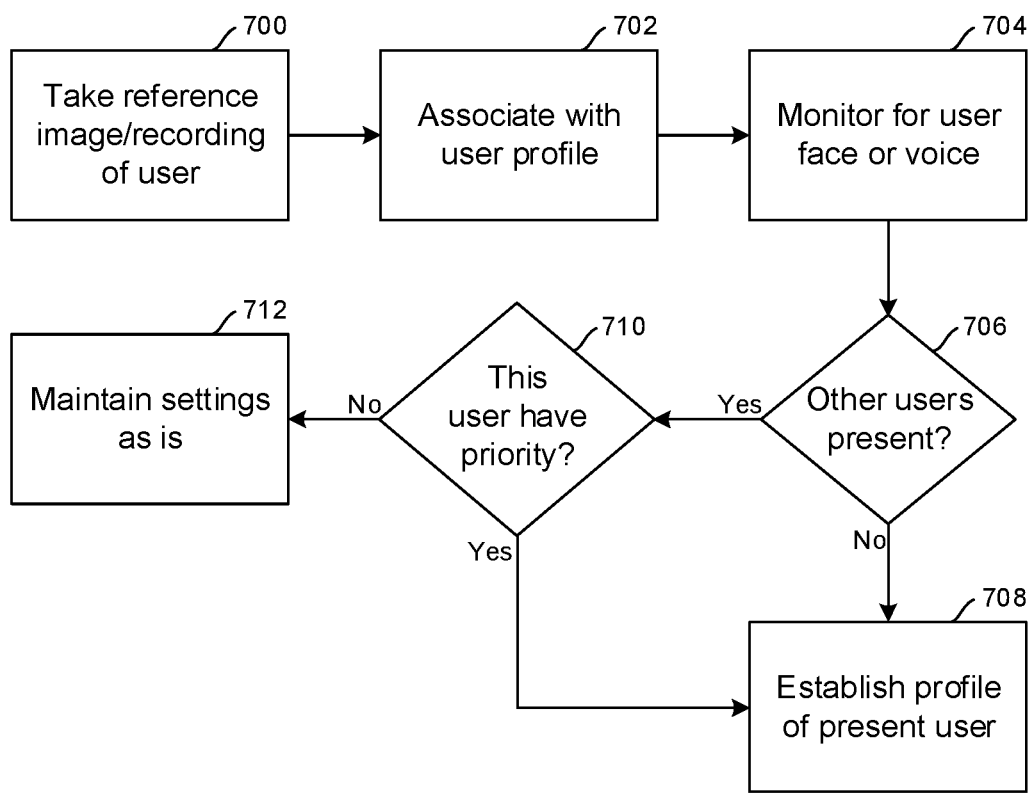
FIG. 7 is a flow chart consistent with present principles.
Figure 8:
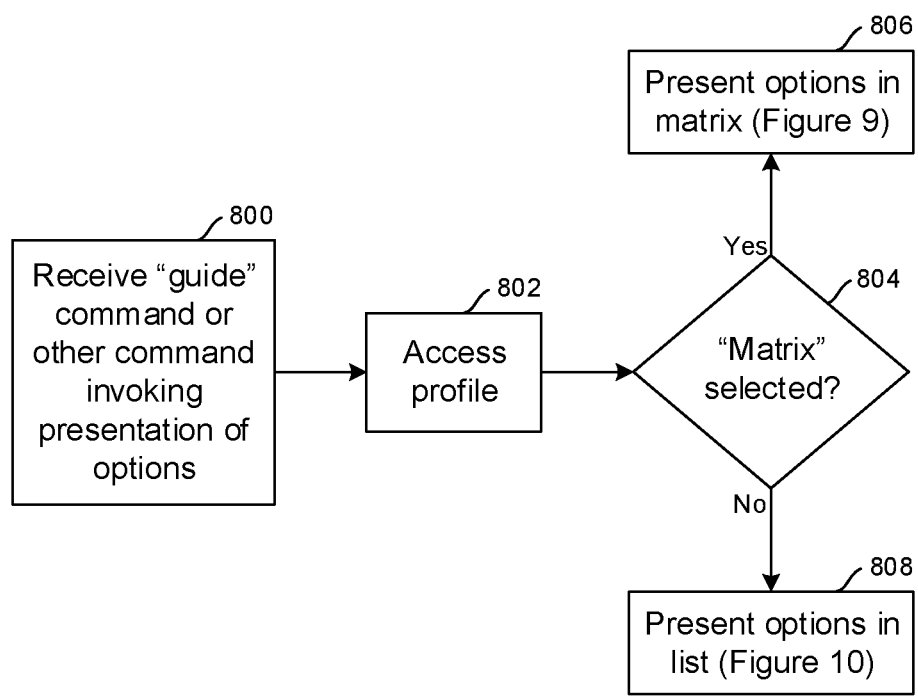
FIG. 8 is a flow chart of example options presentation logic.

FIG. 7 illustrates additional functionality which essentially replaces the need to press the AK 214 above with simply imaging a person's face or voice to accomplish the same easy and convenient establishment of accessibility settings on a display device for the particular user, who may be vision- or hearing-impaired or otherwise find navigation through accessibility menus difficult. At block 700 a reference image and/or voice print is taken of a user ("first user" for clarity) using, e.g., the camera and/or microphone on the AVDD described above. This reference is associated with the settings profile of the first user at block 702 using, e.g., a setup menu that may be operated on behalf of the first user by another person.

Subsequently, the display device can monitor, at block 704, for detections of the first user as indicated by face recognition performed on images from camera or voice recognition performed on voice signals from the microphone. Assuming such a detection is made and matched with the reference obtained at block 700, the logic can proceed to decision diamond 706 to determine whether additional people are present with the first user. If not, the display settings associated with the profile of the first user are established at block 708.

However, if more than the first user is present, the other people may be imaged and compared to reference images to determine if the other people match reference for profiles, and if so, the logic may move to decision diamond 710 to determine, e.g., based on the priority settings of the respective users described above in reference to FIG. 3, which user has priority. If the first user has priority, the display settings associated with the profile of the first user are established at block 708. However, if the first user does not have priority, the display settings associated with the profile of the first user are not established and if desired the settings of the display device may change to the settings associated with the other recognized user having priority or at least may remain unchanged at block 712.

FIGS. 8-11 illustrate additional functionality consistent with present principles. Commencing at block 800 in FIG. 8, a command is received invoking presentation of options on an audio video device (AVD) such as any described above. For example, the "guide" key 210 in FIG. 2 may be manipulated to generate a command to present an electronic program guide (EPG) or other data presenting multiple viewing options, such as one or more of broadcast TV channels, video programs, movies, etc.

Responsive to the command received at block 800, at block 802 a data structure is accessed indicating how options are to be presented. The data structure may be, for instance, the profile of the user whose settings currently are established on the display device and thus may access the selection 322 made from the options 320 in FIG. 3.

Figure 9:
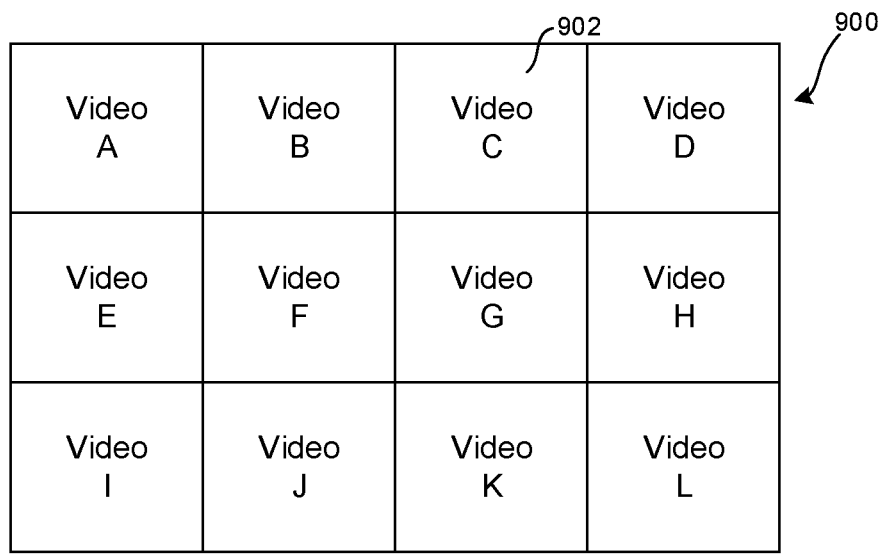
FIGS. 9 and 10 are screen shots of options presented in a matrix and list format, respectively.

Proceeding to decision diamond 804, it is determined whether options are to be presented in matrix or list format. Responsive to the data structure indicating that that options are to be presented as a matrix, the logic moves to block 806 to present on the AVD a user interface (UI) 900 that shows at least some of the options in a matrix, which as shown in FIG. 9 includes plural rows and plural columns of options 902. Typically, an option 902 can be selected using the RC to cause the associated video to be played on the AVD.

On the other hand, responsive to the data structure indicating that that options are to be presented as a list, the logic may move to block 80 to present on the AVD at least some of the options in a single row or column and present none of the options outside the single row or column. A UI 1000 illustrating a single column list 1002 is shown in FIG. 10.

Figure 10:
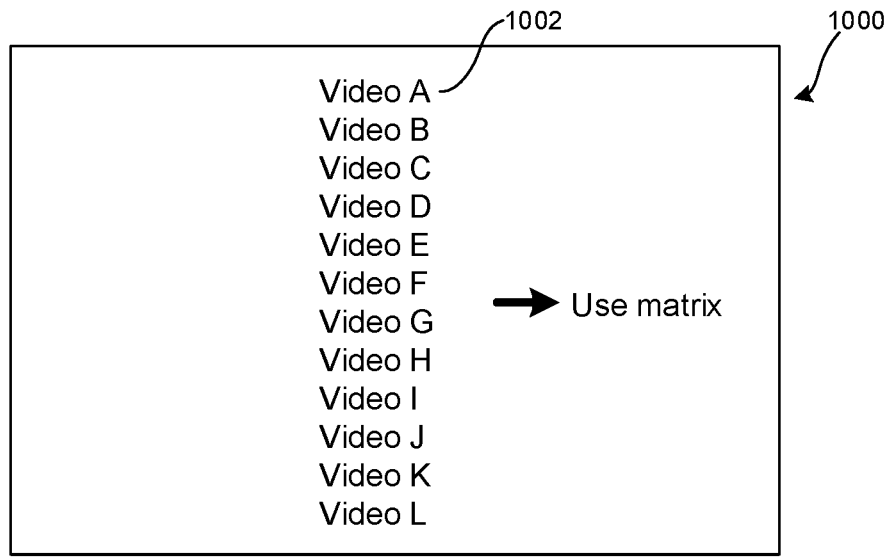
Figure 11:
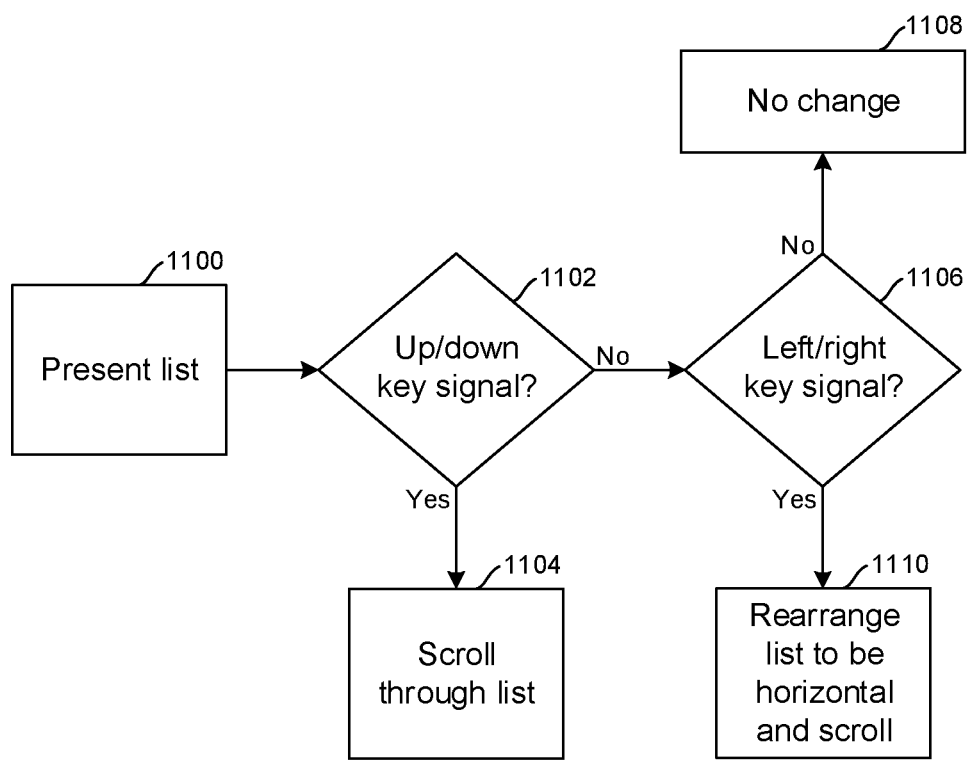
FIG. 11 is a flow chart of example logic for changing a list presentation from vertical to horizontal, it being understood that the same principles apply to changing list presentation from horizontal to vertical.

Note that the list 1002 in FIG. 10 is presented in a column. FIG. 11 illustrates logic in which the list is presented at block 1100, and then it is determined at diamond 1102 that an up or down key signal (e.g., from one of the selectors 208 in FIG. 2) is received. If this occurs, the logic moves to block 1104 to scroll up or down, as dictated by the received key signal, through the list, enabling the user to easily navigate through the options in but one dimension.

As understood herein, the logic may also move to decision diamond 1106 to determine whether a left or right key signal is received. This may of course be implemented by state logic, wherein in the absence of receiving a left or right key signal no change occurs at block 1108.

However, if a left or right key signal is received, if desired the logic may move to block 1110 to rearrange the list 1002 shown in FIG. 2 to be a horizontal list that extends from left to right across the display, and then to navigate through the newly arranged list according to the left and right signals received. In this way, an impaired user who accidentally uses left and right keys to navigate a vertical list is automatically aided by rearranging the list visually to correspond with the keys being used.

It is to be understood that the inverse situation is also contemplated. Thus, when a list is presented in a row on the AVD and a left or right command received, the list scrolls left or right, respectively. However, if an up or down command is received, the list is rearranged to be presented in a column on the AVD and then responsive to receiving an up or down command, the column is scrolled up or down, respectively.

Thus, when an indication is received that a viewer prefers options presented in a list navigable only in one dimension, a list is presented on the display.

The AVD may be made to be non-responsive to an up or down command when displaying a horizontal list or it may be made to be non-responsive to a left or right command when displaying a vertical list.

The options in the list or matrix can include one or more of broadcast and/or streaming video channels such as TV channels, settings for the AVD and/or a remote controller, invocable software applications, pictures and/or music and/or video.

While particular techniques are herein shown and described in detail, it is to be understood that the subject matter which is encompassed by the present application is limited only by the claims.

What is claimed is:

1. An article of manufacture (AOM) comprising:
at least one computer storage that is not a transitory signal and that comprises instructions executable by at least one processor to:
associate a first user settings with a first type of interaction with a key on a remote control (RC);
associate a second user settings with a second type of interaction with the key on the RC:
responsive to receiving signals from the RC indicating the first type of interaction, establish the first user settings on a display device; and
responsive to receiving signals from the RC indicating the second type of interaction, establish the second user settings on the display device, wherein the instructions are executable to:
associate the first and second user settings with the first and second types of user interactions responsive to first and second users selecting, from a from a user interface (UI) presenting the first and second types of interaction, a respective type of interaction using an accessibility key.

2. The AOM of claim 1, wherein the instructions are executable to:
receive a command to present on the AVD plural options;
responsive to the command, access a data structure indicating how options are to be presented;
responsive to the data structure indicating that options are to be presented as a list, present on the AVD at least some of the options in a single row or column and present none of the options outside the single row or column; and
responsive to the data structure indicating that that options are to be presented as a matrix, present on the AVD at least some of the options in a matrix comprising plural N rows and plural M columns of the options, each option in the matrix representing a respective video such that the matrix presents N×M options respectively representing N×M videos.

3. The AOM of claim 2, wherein the plural options comprise broadcast and/or streaming video channels.

4. The AOM of claim 2, wherein the plural options comprise settings for the AVD and/or a remote controller.

5. The AOM of claim 2, wherein the plural options comprise software applications.

6. The AOM of claim 2, wherein the plural options comprise pictures and/or music and/or video.

7. The AOM of claim 2, wherein the instructions are executable to:
present the list in a column on the AVD;
responsive to receiving an up or down command, scroll the column up or down, respectively;
responsive to receiving a left or right command, rearrange the list to be presented in a row on the AVD; and
responsive to receiving a left or right command, scroll the row left or right, respectively.

8. The AOM of claim 2, wherein the instructions are executable to:
present the list in a column on the AVD;
responsive to receiving an up or down command, scroll the column up or down, respectively;
responsive to receiving a left or right command, rearrange the list to be presented in a row on the AVD, and be non-responsive to an up or down command.

9. The AOM of claim 2, wherein the instructions are executable to:
present the list in a row on the AVD;
responsive to receiving a left or right command, scroll the row left or right, respectively;
responsive to receiving an up or down command, rearrange the list to be presented in a column on the AVD; and
responsive to receiving an up or down command, scroll the column up or down, respectively.

10. The AOM of claim 2, wherein the instructions are executable to:
present the list in a row on the AVD;
responsive to receiving a left or right command, scroll the row left or right, respectively;
responsive to receiving an up or down command, rearrange the list to be presented in a column on the AVD, and be non-responsive to a left or right command.

11. An audio video device (AVD) comprising:
at least one processor programmed with instructions;
at least one video display for presenting demanded images under control of the at least one processor;
the instructions being executable by the at least one processor to:
associate a first user settings with a first type of interaction with a key on a remote control (RC);
associate a second user settings with a second type of interaction with the key on the RC:
responsive to receiving signals from the RC indicating the first type of interaction, establish the first user settings on a display device; and
responsive to receiving signals from the RC indicating the second type of interaction, establish the second user settings on the display device, wherein the instructions are executable to:
associate the first and second user settings with the first and second types of user interactions responsive to first and second users selecting a respective type of interaction with an accessibility key (AK) from a user interface (UI) presenting the first and second types of interaction.

12. The AVD of claim 11, wherein the first type of interaction comprises a first number of presses of the key and the second type of interaction comprises a second number of presses of the key, the first and second numbers being different from each other.

13. The AVD of claim 11, wherein the first type of interaction comprises a first duration of press of the key and the second type of interaction comprises a second duration of press of the key, the first and second durations being different from each other.

14. The AVD of claim 11, wherein the instructions are executable to alter presentation of options to a matrix format permitting navigation in two dimensions.

15. The AVD of claim 14, wherein the matrix format comprises plural rows and plural columns of the options.

16. The AVD of claim 11, wherein the instructions are executable to:
present a list of options in a column on the AVD;

responsive to receiving an up or down command, scroll the column up or down, respectively;
responsive to receiving a left or right command, rearrange the list to be presented in a row on the AVD; and
responsive to receiving a left or right command, scroll the row left or right, respectively.

17. The AVD of claim 11, wherein the instructions are executable to:
present a list of options in a row on the AVD;
responsive to receiving a left or right command, scroll the row left or right, respectively;
responsive to receiving an up or down command, rearrange the list to be presented in a column on the AVD; and
responsive to receiving an up or down command, scroll the column up or down, respectively.

18. A method, comprising:
associating a first user settings with a first type of interaction with a key on a remote control (RC);
associating a second user settings with a second type of interaction with the key on the RC:
responsive to receiving signals from the RC indicating the first type of interaction, establishing the first user settings on a display device;
responsive to receiving signals from the RC indicating the second type of interaction, establishing the second user settings on the display device; and
associating the first and second user settings with the first and second types of user interactions responsive to first and second users selecting, from a from a user interface (UI) presenting the first and second types of interaction, a respective type of interaction using an accessibility key.

19. The method of claim 18, wherein the first user settings comprises presenting on the display device at least some accessibility options in a single row or column and presenting no accessibility options outside the single row or column.

20. The method of claim 18, wherein the second user settings comprises presenting on the display device at least some accessibility options in a matrix comprising plural N rows and plural M columns.

\* \* \* \* \*